United States Patent [19]

Butt et al.

[11] 4,297,775
[45] Nov. 3, 1981

[54] METHOD FOR JOINING TWO PLATE TYPE HEAT EXCHANGER CORE SECTIONS WITH AN INTERMODULAR LAYER FOR IMPROVED HEAT TRANSFER

[75] Inventors: Alan G. Butt, La Crosse; Abe G. Whitehead, Onalaska, both of Wis.

[73] Assignee: The Trane Company, La Cross, Wis.

[21] Appl. No.: 147,776

[22] Filed: May 8, 1980

[51] Int. Cl.³ .............................................. B23P 15/26
[52] U.S. Cl. ............................... 29/157.3 R; 165/166;
228/183; 113/1 C; 113/118 V
[58] Field of Search ................. 29/157.3 R, 157.3 A,
29/157.3 C, 157.3 B, 157.3 D, 157.4, 402.18,
402.08, 402.09; 228/183; 113/1 C, 118 R, 118
A, 118 B, 118 C, 118 D, 118 V

[56] References Cited

U.S. PATENT DOCUMENTS

| | | |
|---|---|---|
| 2,252,211 | 8/1941 | Seemiller .................. 29/157.3 B X |
| 2,869,835 | 1/1959 | Butt ...................................... 165/166 |
| 3,359,616 | 12/1967 | Butt ...................................... 228/183 |
| 3,372,453 | 3/1968 | Butt ............................... 29/157.3 R |

Primary Examiner—Nicholas P. Godici
Assistant Examiner—V. K. Rising
Attorney, Agent, or Firm—Carl M. Lewis; Peter D. Ferguson; Ronald M. Anderson

[57] ABSTRACT

A method for joining two plate type heat exchanger core sections, previously brazed individually in intimate heat conducting relationship. The surfaces of the two heat exchanger core sections to be joined are non-planar as a result of brazing. In the method, the two core sections are stacked with their non-planar surfaces to be joined facing toward each other with an interposed layer comprising deformable metallic members. The deformable metallic members are subjected to a shear force causing them to be displaced to conform to the non-planar surfaces, substantially increasing the area over which they are in contact with these surfaces and thereby substantially increasing the heat conduction between the core sections. Closing members are thereafter inserted around the perimeter of the intermodular layer and joined to the heat exchanger core sections with a gas metal arc welding bead.

14 Claims, 8 Drawing Figures

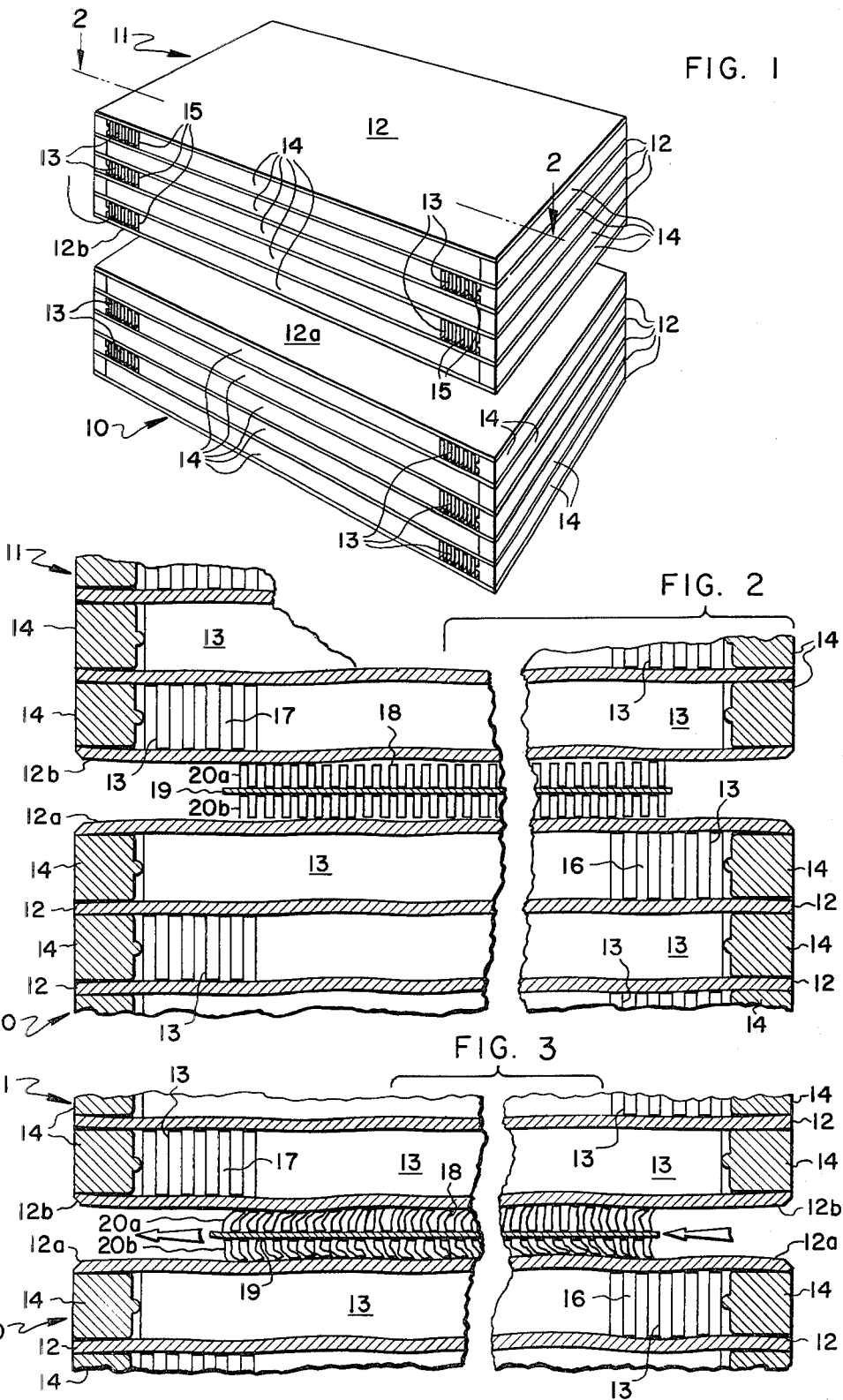

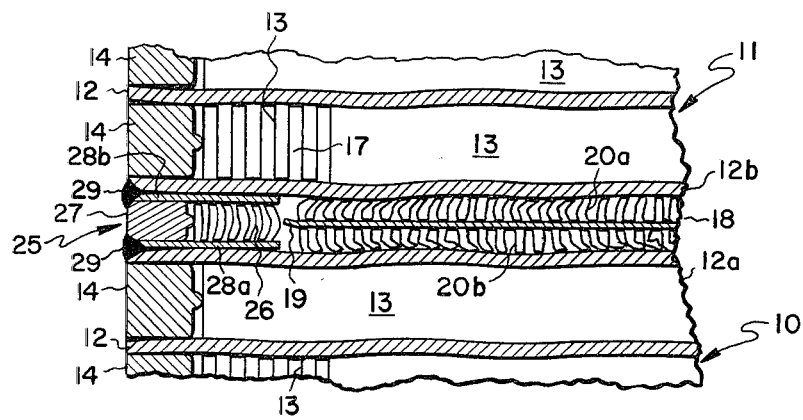
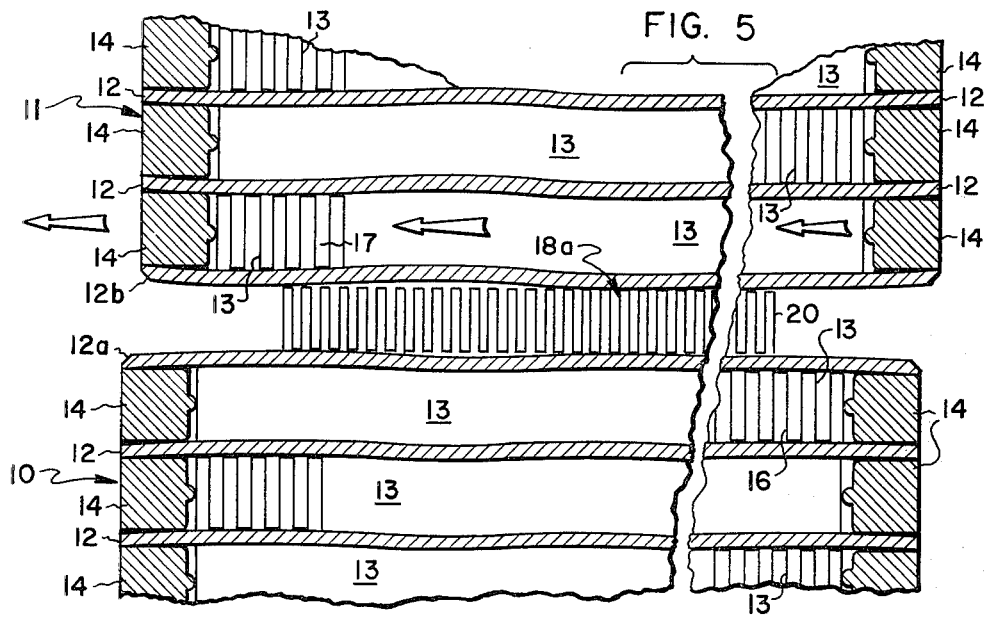
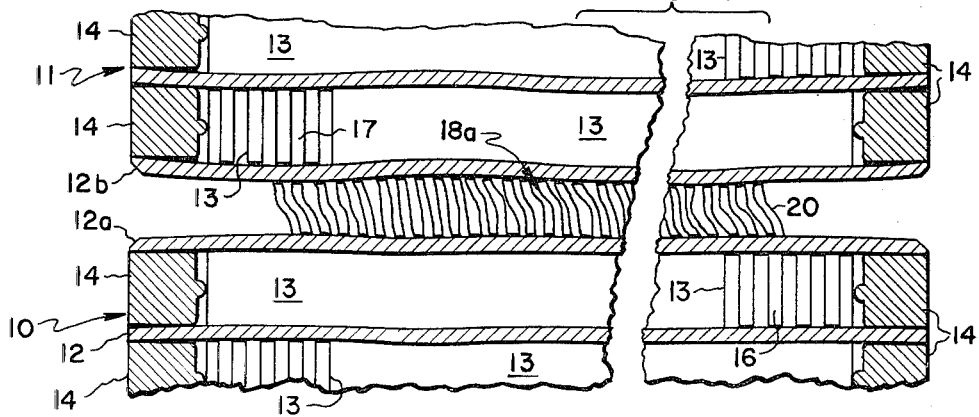

METHOD FOR JOINING TWO PLATE TYPE HEAT EXCHANGER CORE SECTIONS WITH AN INTERMODULAR LAYER FOR IMPROVED HEAT TRANSFER

TECHNICAL FIELD

This invention in general pertains to plate type heat exchangers, and specifically to a method for joining together two plate type heat exchanger core sections previously brazed individually, in intimate heat transfer relationship.

BACKGROUND ART

It is occasionally necessary to construct a heat exchanger having a dimension exceeding the maximum which can be brazed in one assembly. In these circumstances, two heat exchanger core sections which have been previously brazed individually may be joined to obtain a heat exchanger of the required dimensions. In most applications, there is a further requirement that heat transfer between adjacent passages through the heat exchanger be maintained at a relatively uniform and efficient level. However, when two heat exchanger core sections must be joined to obtain a single heat exchanger of the required dimension, it has been found difficult to maintain relatively efficient heat conduction between the passages adjacent their common junction. This is due to the non-planar condition of the two surfaces to be joined, caused by thermal stress occurring when the core sections are separately brazed. Merely bringing the two non-planar surfaces into contact at their high points does not provide adequate heat conduction between the passages adjacent each of these surfaces.

Similarly, if a plate type heat exchanger is damaged, the damaged portion may be removed, and a replacement core section assembled and separately brazed in the aggregate. The problem again arises as to how the replacement core section may be joined to the undamaged core section in a manner which provides acceptable heat conduction therebetween.

U.S. Pat. No. 3,372,453, assigned to the same assignee as the present invention, discloses a method for joining two such heat exchanger core sections, wherein a corrugated metallic heat conductive sheet is placed between the warped side plates of the two core sections to be joined. It has been found, however, that simply compressing the corrugated metallic heat conductive sheet between the two irregular surfaces does not provide complete conformation of that sheet to the irregularities of the non-planar surfaces to provide the required heat conduction efficiency. Mere compression does not cause the yieldable metallic fins of this heat conductive sheet to deform sufficiently so that all the fins are in contact with all parts of the non-planar surfaces of the adjacent heat exchanger core sections.

DISCLOSURE OF THE INVENTION

A method is disclosed for joining together, in intimate heat transfer relationship, two plate type heat exchanger core sections previously brazed individually, wherein the surfaces to be joined are matched in size and are non-planar as a result of brazing in the aggregate. The heat exchanger core sections are positioned so that the non-planar surfaces to be joined face toward each other in generally parallel alignment. An intermodular layer comprising formed metallic fin plates which substantially cover the non-planar surfaces to be joined, except for a narrow band along the perimeter thereof, is interposed between the surfaces.

The two heat exchanger core sections are brought into contact with the intermodular layer, so that the fins of the formed metallic fin plates are in contact with each of the non-planar surfaces where said surfaces deviate toward each other. The intermodular layer is compressed between the non-planar surfaces of the heat exchanger core sections thereby increasing the force exerted on the fins which are in contact therewith.

In order to substantially increase the number of fins in the intermodular layer which are in contact with the non-planar surfaces, the fins in contact are subjected to a shear force causing only these fins to deform by bending. Heat conduction between the two heat exchanger core sections through the intermodular layer is thereby greatly improved.

Finally, the perimeters of the two non-planar surfaces are connected in a manner which circumscribes and maintains the fins of the intermodular layer and maintains their contact with the non-planar surfaces.

BRIEF DESCRIPTION OF THE DRAWINGS

FIG. 1 illustrates in perspective view two heat exchanger core sections to be joined by the method disclosed in the subject invention.

FIG. 2 shows in elevational aspect a sectional view of a portion of the two heat exchanger core sections positioned with the intermodular layer of the first embodiment therebetween.

FIG. 3 shows the intermodular layer of FIG. 2 subjected to a shear force.

FIG. 4 illustrates in elevational aspect part of the sectional view of the heat exchanger shown in FIGS. 2 and 3, with a closing member installed.

FIG. 5 shows the second embodiment in sectional view as in FIG. 2, illustrating the two heat exchanger core sections positioned preparatory to exerting a shear force on the intermodular layer.

FIG. 6 illustrates the disposition of the two heat exchanger core sections shown in FIG. 5 after the intermodular layer of the second embodiment has been subjected to the shear force.

BEST MODE OF CARRYING OUT THE INVENTION

Figure 7:
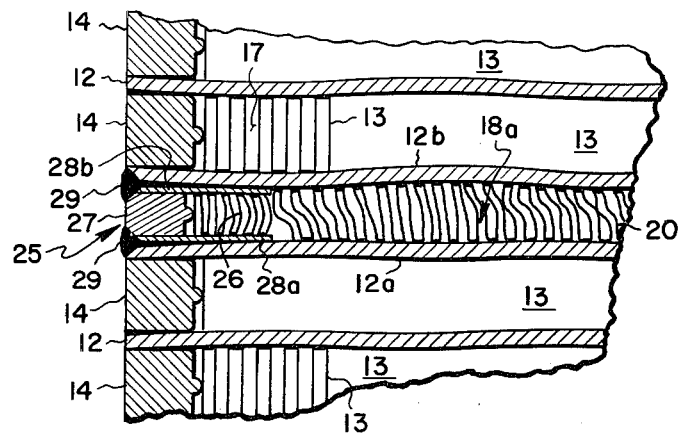
FIG. 7 shows a portion of the heat exchangers shown in FIGS. 5 and 6 with the closing member installed at one end thereof.

With reference to FIG. 1, two heat exchanger core sections 10 and 11, previously brazed individually, are shown prior to being joined by the method of the present invention. Each of the core sections 10 and 11 comprises a plurality of metallic sheets 12 arranged generally parallel in stacked alternating relationship with formed metallic fin members 13, and sealed at their edges with extruded metallic bars 14. The metallic sheets 12, metallic fin members 13, and extruded metallic bars 14 thereby define a plurality of flow passages in layers through the interior of the heat exchanger core sections 10 and 11. Ports 15 between the metallic bars 14 are provided in fluid communication with the fluid flow paths defined by the fin members 13, for separately conveying two fluids into, through, and out of the heat exchanger core sections 10 and 11 in heat transfer relationship. Techniques for assemblying such heat exchanger core sections to be brazed in the aggregate in a salt flux bath are generally well known to those skilled in the art and will therefore not be further discussed.

It is assumed for purposes of this disclosure either that core sections 10 and 11 in combination represent too large a heat exchanger in terms of thermal load, to be singularly brazed in furnace or flux bath, or that one of the heat exchanger core sections 10 and 11 is a replacement for a damaged portion of a larger heat exchanger which has been previously removed, the other of core sections 10 and 11 being the undamaged portion thereof. In both instances, the present invention discloses a method for joining together the core sections 10 and 11 at the exposed non-planar surfaces of metallic sheet 12a of core section 10 and at the exposed non-planar surface of metallic sheet 12b of core section 11, metallic sheets 12a and 12b being of matching dimensions.

The non-planar condition of metallic sheets 12a and 12b resulting from the brazing of core sections 10 and 11 is clearly illustrated in FIGS. 2-7. It should be apparent that these non-planar deviations in the surfaces of sheets 12a and 12b would interfere with uniform and efficient heat conductivity between fluids flowing separately in adjacent layer 16 of core section 10 and in adjacent layer 17 of core section 11, should only a uniform thickness intermodular layer 18 be interposed therebetween, reference FIG. 2. Furthermore, as pointed out in the prior art, there is no known way to successfully braze the two core sections 10 and 11 together either with an intermodular layer or without, that does not subject the resulting heat exchanger to subsequent leakage and failure as a result of reheating the previously brazed joints. Two embodiments of the subject invention are disclosed hereinbelow for providing the required uniform and efficient heat transfer between layers 16 and 17 through non-planar surfaces 12a and 12b by means of conduction through intermodular layer 18.

As FIGS. 2, 3, and 4 show for the first embodiment of the invention, the intermodular layer 18 comprises metallic sheet 19, having deformable metallic members 20a and 20b brazed to each side thereof. The deformable metallic members 20a and 20b are disclosed in the preferred embodiment as formed fin plates, similar in configuration to those formed metallic fin members 13 used in each of the layers of the heat exchanger core sections 10 and 11; however, other designs for deformable metallic members will be apparent to those skilled in the art. In one contemplated embodiment, wherein core sections 10 and 11 are made of aluminum alloy, the deformable metallic members 20a and 20b comprise formed aluminum alloy fin plates measuring 0.508 cm high × 0.203 mm thick, having a density of 7 fins per cm, brazed to each side of an aluminum alloy sheet having a thickness of 1.63 mm, with the fins oriented to run transverse to the length of the sheet. Further, in this contemplated embodiment, the intermodular layer 18 has dimensions approximately 10 cm less in length and in width than the metallic sheets 12a and 12b of heat exchanger core sections 10 and 11, respectively.

The intermodular layer 18 is approximately centered on the metallic sheet 12a of heat exchanger core section 10, heat exchanger core section 11 is positioned such that its edges align with the edges of the lower heat exchanger core section and so that its weight compresses the intermodular layer 18 between metallic sheets 12a and 12b. Depending upon the mass of the core section 11, it may be necessary to apply additional compressive force by such means as a hydraulic press or by stacking additional weight atop heat exchanger core section 11. Intermodular layer 18 will thereby be compressed between the outwardly extending non-planar deviations of metallic sheets 12a and 12b, but will not be in contact with other portions thereof, as shown in FIG. 2. While the compressive force is maintained between heat exchanger core sections 10 and 11, either by gravity alone and/or by other means, metallic sheet 19 is gripped along one end thereof and pulled, thereby subjecting the deformable metallic members 20a and 20b to a shear force. By pulling metallic sheet 19 sufficiently to move it toward the end, e.g., by approximately 5 mm, the deformable metallic members 20a and 20b which are in contact with metallic sheets 12a and 12b and under compressive force will be caused to bend over, reducing the separation between core sections 10 and 11. Thereby, substantially all the deformable metallic members are brought into contact with the metallic sheets 12a and 12b, reference FIG. 3. The shear force applied by pulling the metallic sheet 19 thus causes the deformable metallic members 20a and 20b to conform to the non-planar deviations in the surfaces of the metallic sheets 12a and 12b, greatly increasing the contact area for heat transfer between layers 16 and 17, and providing much improved heat transfer efficiency.

Referring now to FIG. 4, closing member 25 is shown installed at one end of the intermodular layer 18. Closing member 25 comprises a strip of formed metallic fin panel 26, and an extruded metallic bar 27 brazed between two equal size strips of metallic sheet 28a and 29b alinged along an edge thereof in generally parallel relationship. For the contemplated intermodular layer 18 having the dimensions given above, closing member 25 would be made of an aluminum alloy and would have a total thickness of 1.168 cm (using 9.65 mm high fin panels 26 and two 1.016 mm thick metallic sheets 28a and 28b). After closing member 25 is brazed, the extruded metal bar 27 must be ground to bevel each edge where they are brazed to the metallic sheets 28a and 28b. Likewise, it is necessary to scarf the perimeters of metallic sheets 12a and 12b where they are joined to the extruded metallic bars 14 by grinding the edge at a beveled angle.

It has been found that the separation between metallic sheets 12a and 12b typically increases near the perimeter of the core sections 10 and 11 by approximately 1.6 to 2 mm compared to the separation within 5 cm of the perimeter edge. Or stated differently, the facing surfaces of metallic sheets 12a and 12b diverge near their perimeter. Closing members 25 are therefore configured with the fin panel 26 running lengthwise to facilitate the insertion and compression of the closing members 25 between metallic sheets 12a and 12b along their perimeter. Closing member 25 is inserted between metallic sheets 12a and 12b and driven into position taking care that the heat exchanger core sections 10 and 11 are not forced apart. The leading edge of closing member 25 compresses as it is driven into place by deformation of the fin panel 26 as shown in FIG. 4. Although not illustrated in the drawings, it is expected that the closing members 25 would be cut at a 45° angle across their width prior to insertion, to form a mitered corner at the four corners of each end and side of the heat exchanger core sections 10 and 11.

While the compressive force is maintained between the two heat exchanger core sections 10 and 11, the closing members 25 are welded to the perimeters of metallic sheets 12a and 12b and their associated extruded metallic bars 14, using a gas metal arc welding technique. It should be apparent that it would be extremely difficult to rotate the composite heat exchanger to facilitate welding each closing member 25 on a horizontal surface as required when using a tungsten inert gas process. Use of a gas metal arc welding technique permits the two heat exchanger core sections 10 and 11 to be joined with the closing members 25 without concern for rotating the area to be welded to the horizontal position. The gas metal welding process does not rquire the welder to use a "drop-hand" welding technique. Weld shrinkage further promotes contact and heat conduction between metallic sheets 12a and 12b, and metallic sheets 28a and 28b, respectively.

The second embodiment of the subject invention is disclosed in FIGS. 5, 6, and 7. Referring to FIG. 5, the heat exchanger core section 10 is positioned in misalignment with the heat exchanger core section 11, so that the end 30 of core section 11 extends generally parallel to and beyond the end 31 of core section 10, e.g., by about 0.8 cm. An intermodular layer 18a comprising deformable metallic members 20 is interposed therebetween. As described above, the heat exchanger core sections 10 and 11 are stacked so that the required compressive force is supplied at least in part by the weight of the top heat exchanger core section 11. As also explained above, any significant force of compression may be provided, as required. The deformable metallic members 20 are of a size approximately 10 cm less in width and in length than the metallic sheets 12a and 12b and are positioned approximately in the center of metallic sheet 12a.

While the force of compression is applied, the two heat exchanger core sections 10 and 11 are brought into alignment, as for example by pushing on one end 30 of the top heat exchanger core section 11, thereby causing deformable metallic members 20 to bend over in those areas where they are in contact with the outwardly distended non-planar surfaces of metallic sheets 12a and 12b. This brings substantially all the deformable metallic members 20 into contact with metallic sheets 12a and 12b thereby increasing the area for heat transfer between layers 16 and 17 of heat exchanger core sections 10 and 11 respectively. FIG. 6 shows the relative condition of the deformable metallic member 20 in the intermodular layer 18a after the two heat exchanger core sections are brought into alignment.

In this embodiment, for example, it is contemplated that the deformable metallic member 20 might comprise formed metallic fins approximately 1.179 cm high by 0.203 mm thick and having a density of 7 fins per cm. However, other configurations of deformable metallic members 20 are possible which fall within the scope of the invention hereinafter claimed.

In FIG. 7, closing members 25 comprising fin panel 26, extruded metallic bars 27, and metallic sheets 28a and 28b brazed together as described above, are shown installed between metallic sheets 12a and 12b at one end of the intermodular layer 18, for the second embodiment of the invention. Again, it is necessary to scarf the extruded metallic bars 27 at each edge where they are brazed to the metallic sheets 28a and 28b by grinding at an angle to prepare the edge for welding. Similarly, metallic sheets 12a and 12b, where they are brazed to the extruded metallic bars 14, are ground at an angle. Closing members 25 are inserted between metallic sheets 12a and 12b around their entire perimeter, and driven into position as described above. Closing members 25 are thereafter sealed to the perimeter of metallic sheets 12a and 12b using a gas metal arc welding technique to form a bead 29 as also described above.

Figure 8:
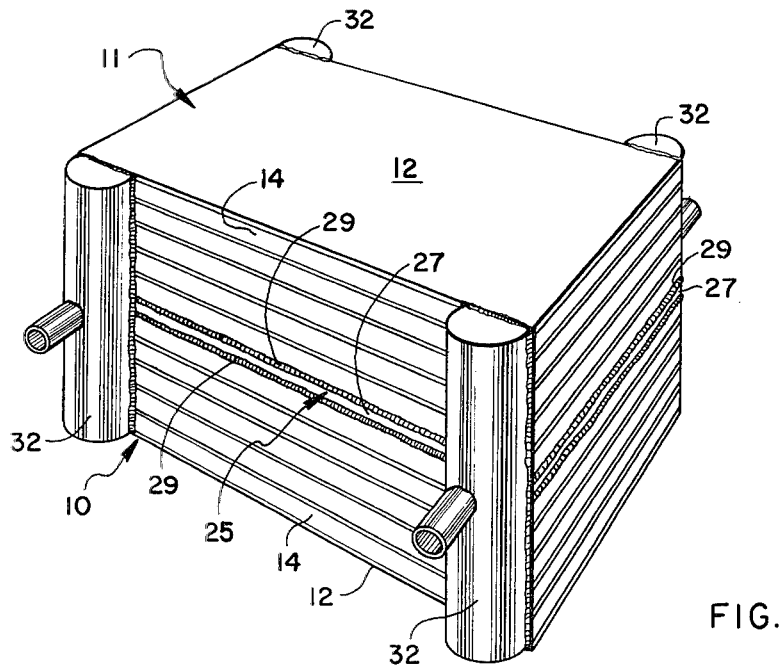
FIG. 8 is a perspective view of the completed heat exchanger formed from the heat exchanger core sections by either embodiment of the subject invention.

Turning now to FIG. 8, the composite heat exchanger formed by joining heat exchanger core sections 10 and 11 is shown with headers 30 welded in place over ports 15. Headers 32 form means for distributing fluid flow into the ports 15 and for collecting fluid flow out of ports 15 as will be well understood by those skilled in the art. Headers 32 are welded into place after closing members 25 have been inserted and welded.

While the invention has been described with respect to preferred embodiments, modifications thereto will be apparent to those skilled in the art within the scope of the invention, as defined in the claims which follow.

We claim:

1. A method for joining together, in intimate heat transfer relationship, two plate type heat exchanger core sections previously brazed individually in the aggregate, wherein the surfaces to be joined are matched in size, comprising the steps of
    a. positioning a plurality of deformable metallic members between and substantially covering said surfaces to be joined, at least one of said surfaces being non-planar as a result of said brazing in the aggregate;
    b. compressig the deformable metallic members between said surfaces to be joined;
    c. subjecting the deformable metallic members to a shear force causing them to deform by bending, thereby reducing the separation between said surfaces and substantially increasing the area over which the deformed metallic members and said surfaces are in contact, whereby heat transfer between the two heat exchanger core sections through the deformed metallic members is greatly improved; and
    d. connecting the perimeters of said surfaces of the heat exchanger core sections together in a manner which generally circumscribes the deformed metallic members, and maintains their contact with said surfaces.

2. The method of claim 1 further comprising the step of brazing the heat conductive deformable metallic members to opposite planar surfaces of a metallic sheet which is substantially the same size as the surfaces of the heat exchanger core sections to be joined, prior to the step of positioning the deformable metallic members between said surfaces to be joined.

3. The method of claim 2 wherein the step of subjecting the deformable metallic members to a shear force comprises the step of pulling on one edge of the metallic sheet.

4. The method of claim 1 wherein the step of positioning the deformable metallic members between the surfaces to be joined includes the step of initially positioning the two heat exchanger core sections in misalignment, such that one of said surfaces extends beyond the other surface along an edge thereof.

5. The method of claim 4 wherein the step of subjecting the deformable members to a shear force includes the step of shifting the heat exchanger cores into alignment.

6. The method of claims 3 or 5 wherein the step of positioning the deformable metallic members between the surfaces of the heat exchanger core sections to be joined includes the step of stacking the heat exchanger core sections, one atop the other, with said surfaces to be joined facing toward each other with the deformable metallic members therebetween and wherein the step of compressing the deformable metallic members is at least in part accomplished by the force of gravity acting on the mass of the top heat exchanger core section.

7. The method of claim 1 wherein the step of connecting the perimeters of the surfaces of the heat exchanger core sections to be joined includes the step of inserting a closing member between the perimeters of said surfaces, and sealing the closing member to the perimeter of each of said surfaces with a gas metal arc welding bead.

8. The method of claim 7 wherein said closing member comprises a strip of sheet fin panel and metallic bar brazed between two strips of metallic sheet, further comprising the step of scarfing the brazed closing member at a beveled angle along the edge where the two metallic sheets are brazed to the metallic bar, and scarfing the surfaces of the heat exchanger core sections at a beveled angle along their perimeter, in order to facilitate proper joining by the gas metal arc welding bead.

9. The method of claims 1, 2, 3, 4, or 5 wherein said deformable metallic members are formed fin plates.

10. A method for joining together, in intimate heat transfer relationship, two plate type heat exchanger core sections previously individually brazed in the aggregate, wherein the surfaces to be joined are matched in size and are non-planar as a result of brazing, comprising the steps of a. positioning the heat exchangers so that the non-planar surfaces to be joined face toward each other in generally parallel alignment;

b. interposing an intermodular layer between the non-planar surfaces, said intermodular layer comprising formed metallic fin plates which substantially cover the non-planar surfaces to be joined, except for a narrow band along the perimeter thereof;

c. bringing the heat exchanger core sections into contact with the intermodular layer, one non-planar surface at one side thereof and the other non-planar surface at the other side thereof, so that fins of the formed metallic fin plates are in contact with the non-planar surfaces where said surfaces deviate toward each other;

d. compressing the intermodular layer between the non-planar surfaces of the heat exchanger core sections, thereby increasing the force exerted by the non-planar surface on the fins in contact therewith;

e. subjecting the fins which are in contact with the non-planar surfaces to a shear force causing them to deform by bending, thereby substantially increasing the number of fins of the intermodular layer which are in contact with the non-planar surfaces, so that heat transfer between the two heat exchanger core sections through the intermodular layer is greatly improved; and f. connecting the perimeters of the non-planar surfaces together in a manner which generally circumscribes the intermodular layer, and maintaining the fins of the intermodular layer in contact with the non-planar surfaces.

11. The method of claim 10 wherein the intermodular layer comprises formed fin panels brazed to opposite planar surfaces of a metallic sheet, and wherein the step of subjecting the fins to a shear force further comprises the step of pulling on one edge of the metallic sheet.

12. The method of claim 10 wherein the step of positioning the two heat exchanger core sections includes the step of initially positioning the two heat exchanger core sections in misalignment, such that one of said non-planar surfaces extends beyond the other non-planar surfaces along an edge thereof, and wherein the step of subjecting the fins to a shear force includes the step of shifting the heat exchanger cores into alignment.

13. The method of claims 11 or 12 wherein the step of positioning the heat exchanger core sections further includes the step of stacking the heat exchanger core sections, one atop the other with said non-planar surfaces facing toward each other with the intermodular layer therebetween; and wherein the step of compressing the intermodular layer is at least in part accomplished by the force of gravity acting on the mass of the top heat exchanger core section.

14. The method of claim 10 wherein closing members are provided, each comprising a strip of metallic fin panel, and a metallic bar brazed between two equal size, generally parallel strips of metallic sheet aligned along an edge thereof, further comprising the steps of scarfing the closing members at a beveled angle along the edges where the two metallic sheets are brazed to the metallic bar; scarfing the perimeter edges of the non-planar surfaces at a beveled angle; inserting the closing members between the non-planar surfaces along their perimeters; and sealing the closing members to the perimeters of the non-planar surfaces with a gas metal arc welding bead laid in the scarfed portion of the closing members and the perimeters of the non-planar surfaces.

* * * * *